Dec. 27, 1955 A. V. BEDFORD 2,728,812

SYNCHRONIZING APPARATUS

Filed Feb. 11, 1950 4 Sheets-Sheet 1

INVENTOR
Alda V. Bedford
BY
ATTORNEY

INVENTOR
Alda V. Bedford
BY
ATTORNEY

SYNCHRONIZING APPARATUS

Filed Feb. 11, 1950 4 Sheets-Sheet 4

INVENTOR
Alda V. Bedford
BY
ATTORNEY

United States Patent Office 2,728,812
Patented Dec. 27, 1955

2,728,812

SYNCHRONIZING SYSTEM

Alda V. Bedford, Princeton, N. J., assignor to Radio Corporation of America, a corporation of Delaware Application February 11, 1950, Serial No. 143,800

28 Claims. (Cl. 178—5.4)

The invention relates to apparatus for synchronizing sampling operations performed in a television receiver with sampling operations performed in a television transmitter.

In many image transmission systems the continuously varying video signals, generally supplied by a television camera, are sampled during a first series of predetermined uniformly spaced intervals before being applied to a transmission link. At the receiver it is necessary to sample the signals conveyed by the transmission link during a corresponding series of uniformly spaced intervals that have the same phase relationship to the video signals as the first series of intervals, taking into account the time of transmission.

For example, in a color television system of the dot multiplex type, each of a plurality of continuous video signals represents the intensity variations of one of the component colors. These colors make up the natural coloring of an object or field of view. All of these video signals are sampled by a time diviison multiplexer so as to derive one video wave that successively represents the intensities of the different component colors.

The sampling technique is also employed in certain quantizing systems. In one such system, for example, the continuous video signal corresponding to a first component color is quantized, i. e., a signal is developed that has a fixed value when the continuously varying video signal is within one predetermined range of values and another fixed value when the continuously varying video signal is within another range of values. This quantized signal is sampled, generally at a frequency equal to twice the cut-off frequency of the transmission system, and samples of the video signals representing the intensity variations of the other component colors are added to the samples of the video signals corresponding to the first component color. In both of these cases, namely dot multiplexing and quantizing, stable synchronization of the sampling at the transmitter and receiver is essential to color fidelity.

Proper synchronization of the phase and frequency of sampling at television receivers with the sampling at a television transmitter requires that a special sampling control signal be transmitted in addition to the horizontal and vertical sync signals generally employed. This sampling control signal must not, however, interfere with the operation of the receiver. To provide and to use a non-interfering control signal in a novel manner is the primary aim of the present invention.

It is apparent to those skilled in the art that a sampling control signal can be transmitted as a modulation of a separate carrier. However, this is highly objectionable, as it increases the bandwidth required by each television channel. Furthermore, it necessitates additional equipment at the transmitting station, at repeating stations and in cables employed to tie transmitting stations into a network.

Accordingly, therefore, it is an object of this invention to provide an improved means for synchronizing sampling at a television receiver with sampling at a television transmitter.

It is a further object to provide an improved apparatus for transmitting, in a television system, a sampling control signal in such a manner that no additional bandwidth is required.

Another purpose of the invention is to provide an improved apparatus for controlling the sampling of a television receiver in response to a special sampling control signal.

A still further object of the invention is to provide an improved apparatus for transmitting a sampling control signal in a television system in such manner as not to interfere with the normal operation of the receivers.

These and other objects of the invention will become apparent from a detailed consideration of the drawings in which.

In television systems of a type in which this invention may be incorporated, video information is transmitted during recurring intervals, and scanning control signals, as well as blanking signals, are transmitted in between these intervals. In accordance with present practice, a horizontal sync pulse is superimposed on a blanking pulse, and that portion of the blanking pulse following the superimposed horizontal sync pulse is generally termed the "back porch." This term will be used for the sake of brevity and convenience. In one form of this invention, a sampling control signal of a properly selected frequency is transmitted during this back porch interval, that is to say, it follows a sync signal, but occurs during horizontal blanking. At the receiver the sampling control signal occurring during the back porch interval is used to control the phase and frequency of the sampling oscillator. In this way, extremely stable synchronization can be obtained between the sampling at the receiver and the sampling at the transmitter in such a manner as not to interfere with the normal operation of the television receiver. The sampling control signal comprises several cycles (i. e. a burst) of a selected frequency. Subsequently in the specification and in the claims the sampling control signal also will be referred to as a burst, a burst of sampling control frequency and a burst of sine wave oscillations.

Figure 1:
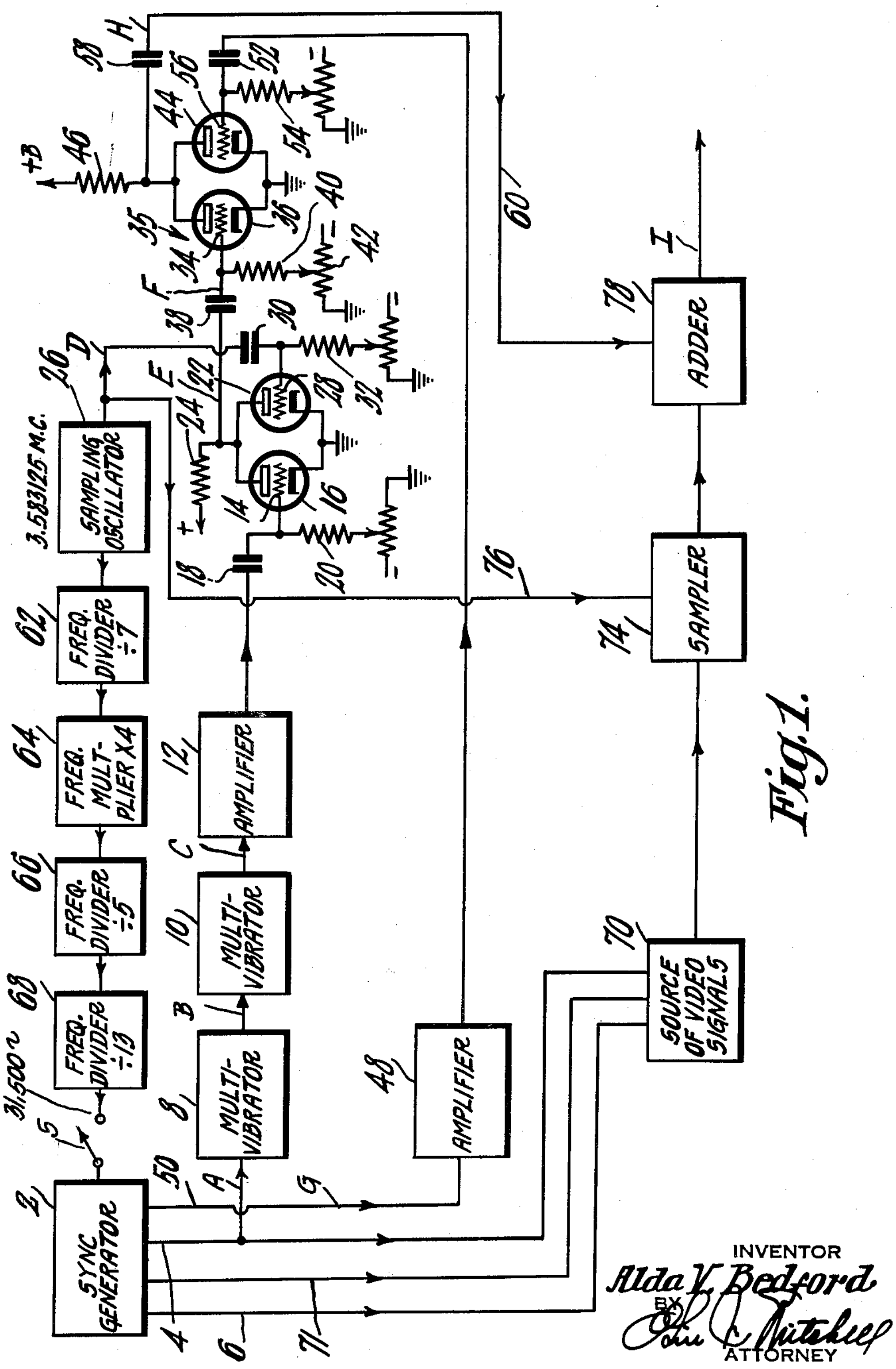
Figure 1 shows in block and schematic form an arrangement for transmitting sampling control signals in accordance with the principles of this invention.

In Figure 1, there is shown an arrangement whereby the sampling control frequency is injected into the signal train to be applied to the transmitter during the back porch interval. For purposes of convenience, Figure 1 will be discussed in connection with the curves shown in Figure 2, curve A appearing at point A in the circuit and curve B appearing at point B in the circuit, etc. A sync generator 2 of any standard type such, for example, as that described in U. S. Patent No. 2,258,943 issued to Bedford on August 14, 1941, provides a means for furnishing horizontal driving pulses, such as that shown in curve A of Figure 2, on an output connection or lead shown schematically and designated by reference character 4. The horizontal and vertical blanking pulses are not shown in the curves of Figure 2 but are provided by an output lead 6. The leading edge of the horizontal driving pulse A triggers a multivibrator 8. The multivibrator 8 is adjusted so that its output pulse B has a duration greater than the duration of the driving pulse A, and the trailing edge of the output pulse B is employed to trigger multivibrator 10 so as to provide pulses C. These multivibrators 8 and 10 are so tuned that their recovery time exceeds the line scanning interval, thus ensuring that their change in output polarity occurs only when they are triggered.

As will be apparent to those skilled in the art, the multivibrators 8 and 10 could be of free-running type, in which case they are tuned so that their natural period of oscillation exceeds the line scanning period in order to insure that the change in the output polarity of their signal will occur only when they are triggered. On the other hand, either or both of them might be flip-flop multivibrators such as the well known Eccles-Jordan type in which their output changes polarity for a predetermined interval following the application of a suitable triggering signal. Furthermore, either of these multivibrators could be replaced by blocking oscillators of the type illustrated in the U. S. Patent No. 2,101,520 to Tolson et al. By any of these well known means pulse C can be made to occur during any desired portion of the back porch.

Although it may be preferable that pulse C occur during the back porch interval, it is within the scope of this invention to generate it for a predetermined time after either the leading or the trailing edges of the horizontal driving pulse A. This can be accomplished by employing but a single multivibrator or equivalents thereof and by triggering it either at the leading or trailing edges of sync.

It is also apparent that in any of the above arrangements pulses C can be generated independently of the driving pulses. However, some positive means for controlling the phase of the pulses C with respect to the driving pulse is preferable in order to insure that the burst of control frequency occurs during the proper intervals. Furthermore, instead of deriving pulses C from the driving pulse, the driving pulses might be derived from the pulses C.

Figure 2:
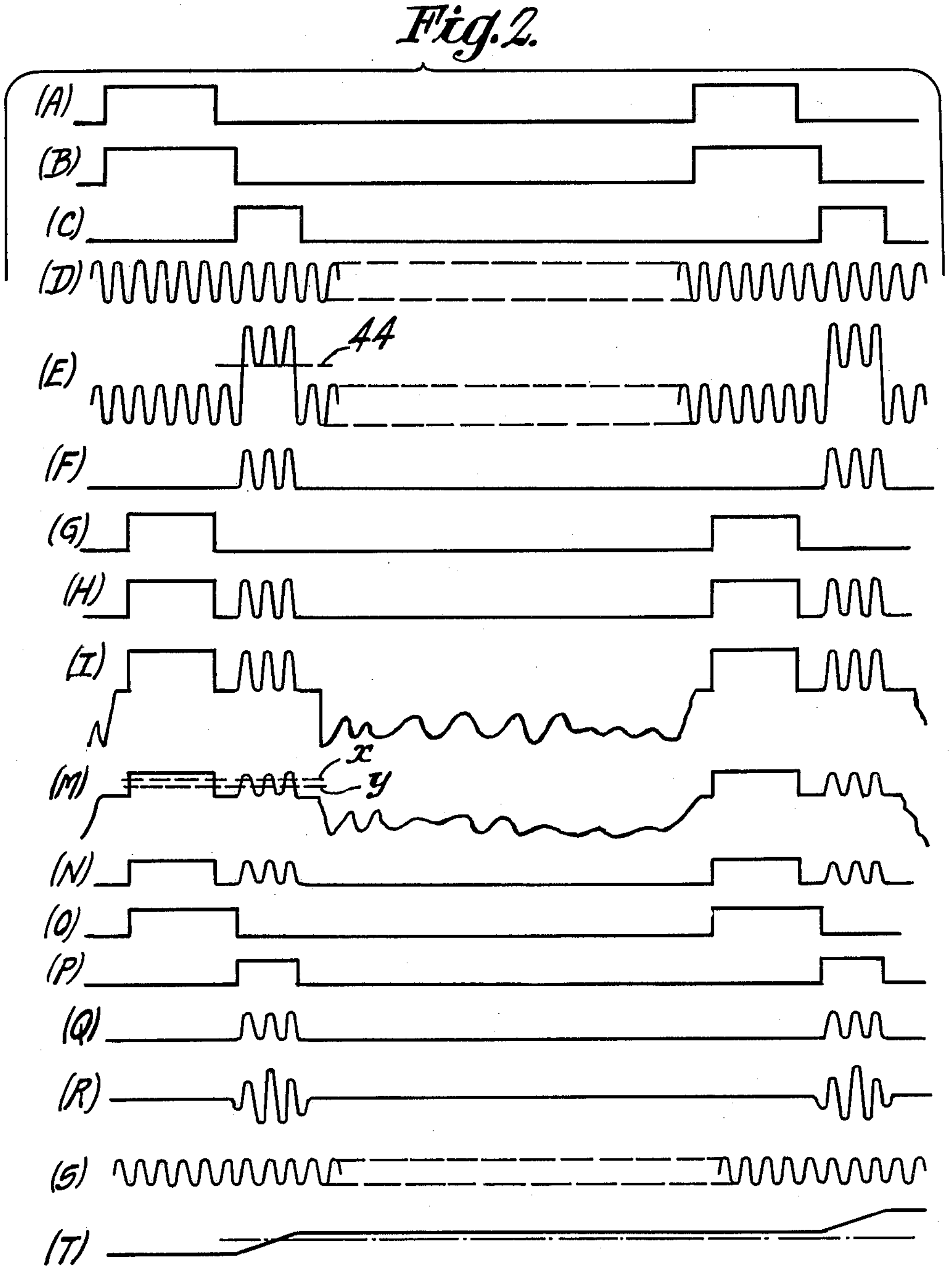
Figure 2 illustrates waveforms that occur at various points in the arrangement of Figure 1.

The following means are provided for adding the pulses C and the continuous oscillations D provided by a sampling oscillator 26 so that the voltage appearing at the plates of the tubes 16 and 22 is that shown in curve E. After passing through a suitable number of stages of amplification in amplifier 12, pulse C is inverted and applied in a negative sense to the grid 14 of tube 16 via coupling condenser 18 and grid leak resistor 20, the lower end of the grid leak resistor 20 being connected to a suitable source of fixed potential as shown. Tube 22 is connected in parallel with tube 16, the plates of the two tubes being tied to a source (not shown) of B+ potential via a common variable resistor 24 and their cathodes being tied to ground. The output of the sampling oscillator 26 shown in curve D is supplied to the grid 28 of the tube 22 via coupling condenser 30 and grid leak resistor 32, the lower end of the resistor 32 being connected to a suitable bias potential. In this way, waveform E of Figure 2 is derived.

The voltage wave E is coupled to the grid 34 of tube 36 of adder 35 via condenser 38 and grid leak resistor 40. The condenser 38 is sufficiently large to pass the A. C. voltage wave represented by the pulses C. The grid leak resistor 40 is connected to a source of negative bias potential 42 that is sufficiently great to maintain tube 36 at cut-off until voltage waveform E exceeds the value shown by the dotted line 44 in curve E in Figure 2. Thus, tube 36 acts as a limiter and its plate voltage varies in accordance with waveform F of Figure 2. Tube 44 of adder 35 is connected in parallel with tube 36, the plates being tied together and to a source of B+ potential via a common plate load resistor 46 and the cathodes being tied to ground. The composite horizontal and vertical sync wave provided by the sync generator through lead 50 is amplified by amplifier 48 and applied via coupling condenser 52 and grid leak resistor 54 to the grid 56 of tube 44. This wave is illustrated by wave G of Figure 2 which shows only the horizontal pulses of this composite wave. In this way, means are provided for adding the sync wave and the burst of sine wave oscillations provided by tube 36 so as to provide an output waveform across the resistor 46, such as shown in curve H of Figure 2. This new sync wave is coupled via condenser 58 to an output lead 60.

The reason for superimposing the burst onto the top of the blanking pulse is to prevent the kinescope of a standard receiver from being unblanked during retrace time so as to interfere with the image being reproduced. However, increased power can be obtained by placing the axis of the burst of control frequency at the top of the blanking pulse and by increasing its amplitude. The burst can be prevented from unblanking the kinescope in the receiver by generating a blanking pulse at the receiver in response to the burst and by applying it in such manner as to blank the kinescope. The important part of the invention is to provide a burst that occurs during the time that would normally not be useful in the receiver for actual picture reproduction because of the necessity of returning the scanning beam at the completion of each line.

Under some circumstances, the phase relationship between the sine waves supplied by sampling oscillator 26 and the sync pulses provided by sync generator 2 is of extreme importance. With switch S in an open position this phase relationship could be approximately maintained if the base oscillators usually employed in sync generator 2 and in the sampling oscillator 26 were crystal controlled. However, some applications require an extremely accurate control of the phase relationship between the sync pulses and the sampling rate, and under these circumstances, the sync generator is made dependent on the sampling oscillator by the following means. Generally speaking, sync generators now in use are provided with an oscillator which oscillates at a frequency that is twice the horizontal scanning frequency, and in accordance with present day standards, this would be a frequency of 31,500 cycles per second. This 31,500-cycle frequency can be derived from the sampling oscillator 26 in the following manner. Assume, for example, that the sampling frequency provided by sampling oscillator 26 is 3.583125 megacycles. If this frequency is divided by 7 in frequency divider 62, multiplied by 4 in frequency multiplier 64, divided by 5 in frequency divider 66 and divided by 13 in frequency divider 68, the frequency supplied to the right-hand terminal of the switch S would be 31,500 cycles per second. Therefore, if the switch S is closed, this 31,500-cycle per second may be substituted for the output of the oscillator normally used in the sync generator 2. Other ways of deriving the 31,500-cycle frequency from the output of the sampling oscillator will be apparent to those skilled in the art.

The frequency of the sampling oscillator depends on the system in which this invention is employed. The frequency of the sampling oscillator in the above example (3.583125 mc.) bears such a relation to the horizontal scanning rate of present day television systems that its phase with respect to the line scanning interval changes by 180 degrees on each successive line. This is useful in certain types of double horizontal interlacing employed in dot sequential systems. However, the particular frequency does not constitute a part of this invention.

The manner in which the above apparatus can be incorporated into any type of transmitter will now be explained. The video signals supplied by the source 70 may be of any desired type. For example, they may be three separate video signal trains, each corresponding to a different component color of the image to be televised or they may be a single video train representing a monochrome or black and white image. In any case, blanking, horizontal driving and vertical driving in the source 70 is controlled by signals on leads 6, 4 and 71 respectively in a manner well known to those skilled in the art.

The sampler 74 to which the output of source 70 is applied may also be of any type. For example, it may be a multiplexer such as is used in dot sequential color television systems wherein the separate video signal trains, that are representative respectively of the intensity variations of a plurality of component colors, are successively supplied at or near image elemental rate to a single output channel. In another example, sampler 74 may simply operate to pass signals emanating from source 70 only during successive uniformly spaced intervals, but in any case, sampler 74 derives its control voltage from oscillator 26 via lead 76.

The complete composite video wave such as waveform I shown in Figure 2 is assembled by a means of an adder 78 for combining the output of the sampler 74 and the output of the adder 35. If the cut off frequency of the output circuits of the sampler 74 is sufficiently low in comparison with the frequency of the samples supplied by the sampler 74, the samples taken of the blanking pulses provided by the source 70 will be integrated to form a blanking pulse having a smooth top, as indicated in waveform I. If, however, the cut off frequency of the output circuits of the sampler 74 cannot for some reason be made sufficiently low to integrate the samples taken during the blanking time into a smooth wave, this difficulty can be overcome in many ways known to those skilled in the art. For example, the blanking process could be carried out by apparatus (not shown) connected between sampler 74 and adder 78.

Figures 3, 4:
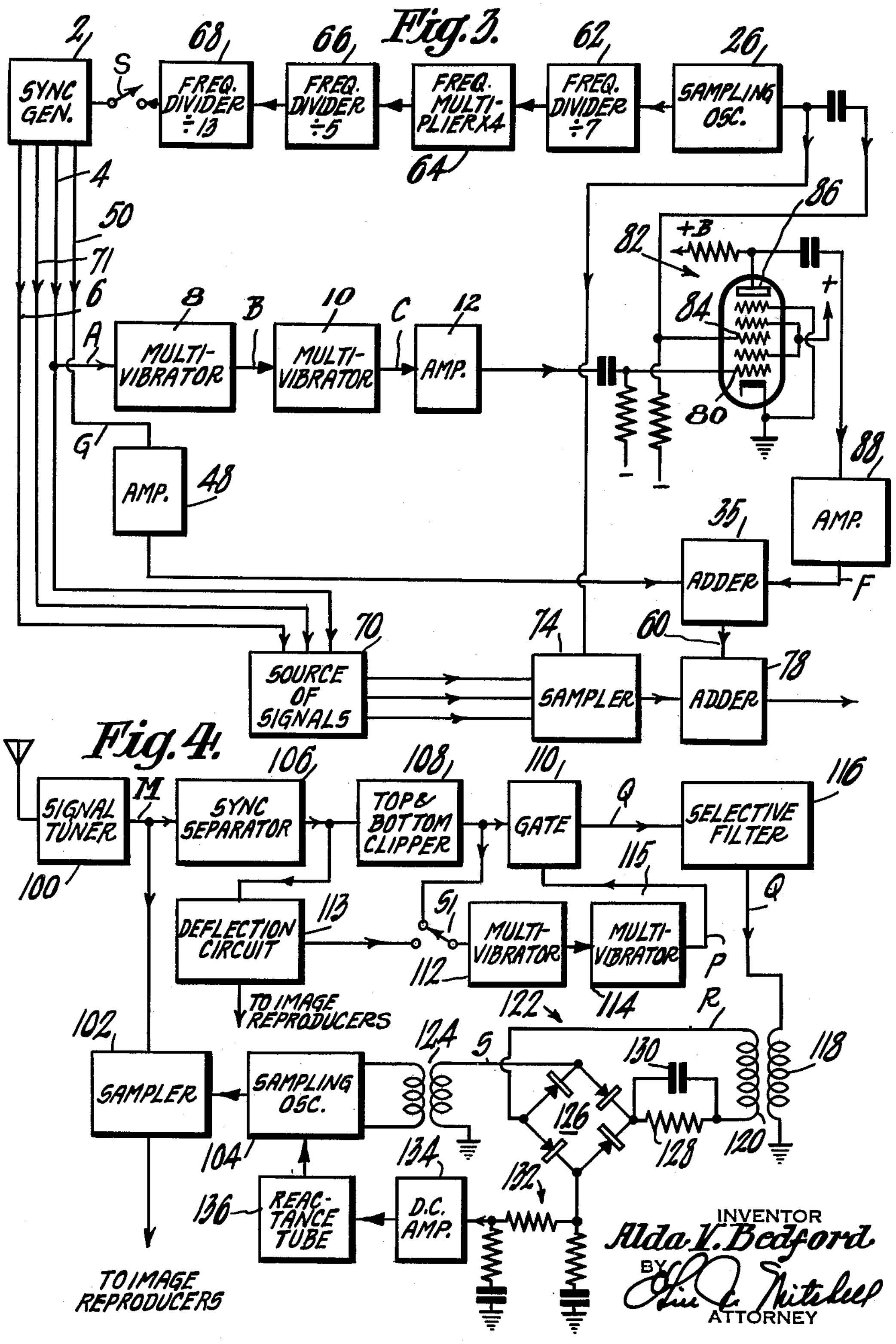
Figure 3 shows a different means for transmitting sampling control signals in accordance with the principles of this invention.
Figure 4 shows a receiver in which the sampling is synchronized with the transmitted sampling control signal.

Figure 3 shows a different means of inserting the burst of control frequency in accordance with this invention during the back porch interval. For the sake of simplicity, those components that are similar to the components of Figure 1 will be indicated by the same numerals. In this particular arrangement, the pulses C are supplied in a positive-going sense to the grid 80 of a pentagrid converter 82, and the output of the sampling oscillator 26 indicated by waveform D in Figure 2 is supplied to the grid 84 of the same tube. These grids are biased in such a way that the tube is cut off, except during the presence of the positive pulses C. The bias is also adjusted so that the negative swings of the waveform D applied to grid 84 just bring the tube to cut off. Therefore, the voltage appearing at the plate 86 of the pentagrid converter 82 will be the negative of curve F of Figure 2. This negative wave F appearing at the plate 86 is passed through amplifier 88 which reverses its polarity and produces wave F of Figure 2. The horizontal and vertical sync wave G present on lead 50 is combined in adder 35 with the waveform F so as to form the waveform H of Figure 2. This new complete sync signal including the burst of sampling control frequency is combined with the rest of the signal train in the adder 78, as was explained in connection with Figure 1.

Figure 4 illustrates a receiver embodying the invention which is adapted to sample the received signal at a rate and phase determined by the burst of sampling control frequency appearing during the back porch interval. A signal tuner 100 including a demodulator provides a signal corresponding to waveform M of Figure 2. Waveform M is the same as the transmitted waveform I except for changes introduced by the transmission link. The details of the signal tuner 100 need not be explained for the reason that they are well known to those skilled in the art. Regardless of the type of sampler 102 that is employed, the phase and frequency of the samples with respect to the received wave M is controlled by the sampling oscillator 104.

The phase and frequency of sampling oscillator 104 are, in turn, controlled by the following means. Waveform M is also applied to any well known type of sync separator 106. In order to minimize the effects of noise, some of these known sync separators perform a double clipping action at a point above blanking level such as indicated by the dotted lines $x$ and $y$ in waveform M of Figure 2. In this particular embodiment, in order to make a clear indication that this double clipping action is performed, the output of the sync separator has been shown in the block diagram as being applied to a top and bottom clipper 108, which supplies the signal appearing between the levels $x$ and $y$ of waveform M to a gating circuit 110. In this way amplitude selection of the burst of sampling control frequency is provided. This signal may be applied via switch $S_1$ to cascade or series-connected multivibrators 112 and 114 which operate in a manner similar to that of multivibrators 8 and 10 of Figures 1 and 3, or their equivalents, and which constitute a means for deriving pulses that occur only during the back porch interval. A single multivibrator that is triggered from either the leading or the trailing edge of the horizontal sync pulse or from the output of the horizontal deflection circuit may be used instead of the multivibrators 112 and 114. The duration of the pulse thus provided can be adjusted to include the burst, and even though it would also include the sync pulse itself, in the case where it is triggered on the leading edge, this would not be harmful. When switch $S_1$ is in the position opposite to that shown, the sync pulse for controlling the multivibrators 112 and 114 may be derived from the deflection circuits 113 if desired. The output of multivibrator 112 is indicated by the waveform O in Figure 2 and the output of multivibrator 114 is indicated by the waveform P of Figure 2. The pulses present in waveform P occur during the back porch interval and are applied so as to operate any well known type of gating means 110. In this way, only the bursts of the sampling control frequency, such as indicated by waveform Q of Figure 2, are present in the output of the gating device 110. This is therefore one way of providing time selections of the bursts of sampling frequency. In order to eliminate any extraneous frequencies, the waveform Q may be applied to a selective filter 116 so as to effect frequency selection of the bursts of sampling control frequency, and the output of the filter is applied to the primary 118 of transformer 120.

In order to provide means for controlling the phase and frequency of the sampling oscillator 104 with the bursts of sampling control frequency appearing in the primary 118, the output of the sampling oscillator 104 and these bursts of sampling control frequency are applied to a phase discriminator generally indicated by the numeral 122. The details of the phase discriminator 122 are as follows. The output of the sampling oscillator 104 is coupled through transformer 124 to diagonally opposed points in the single phase bridge rectifier 126. A waveform similar to that indicated by the letter R of Figure 2 is coupled by transformer 120 to the opposite pair of diagonal points in the bridge rectifier 126. In series with this coupling is a self-biasing arrangement comprised of a parallel resistance 128 and condenser 130. The polarity of the unilateral current conducting elements in each arm of the rectifying bridge 126 is such that current from the oscillator can only flow through the rectifier during the presence of the burst of sampling control frequency provided by the transformer 120. The output of the bridge rectifier 126 is applied to a smoothing filter generally indicated by numeral 132 so as to develop a waveform such as T of Figure 2. After passing through D. C. amplifier 134 this wave is applied to control the conduction of the reactance tube 136. The reactance tube 136 controls the phase and frequency of the sampling oscillator 104 in a manner well known to those skilled in the art.

The time constants of the feedback circuits including filter 132, D. C. amplifier 134 and reactance tube 136 are preferably made long in comparison with the interval between bursts so that the phase of oscillator 104 is maintained constant during that time. This is indicated by the fact that wave form T only changes amplitude during the burst interval. The interval between bursts will be in the order of microseconds and very little, if any, drifting will occur.

Figure 5:
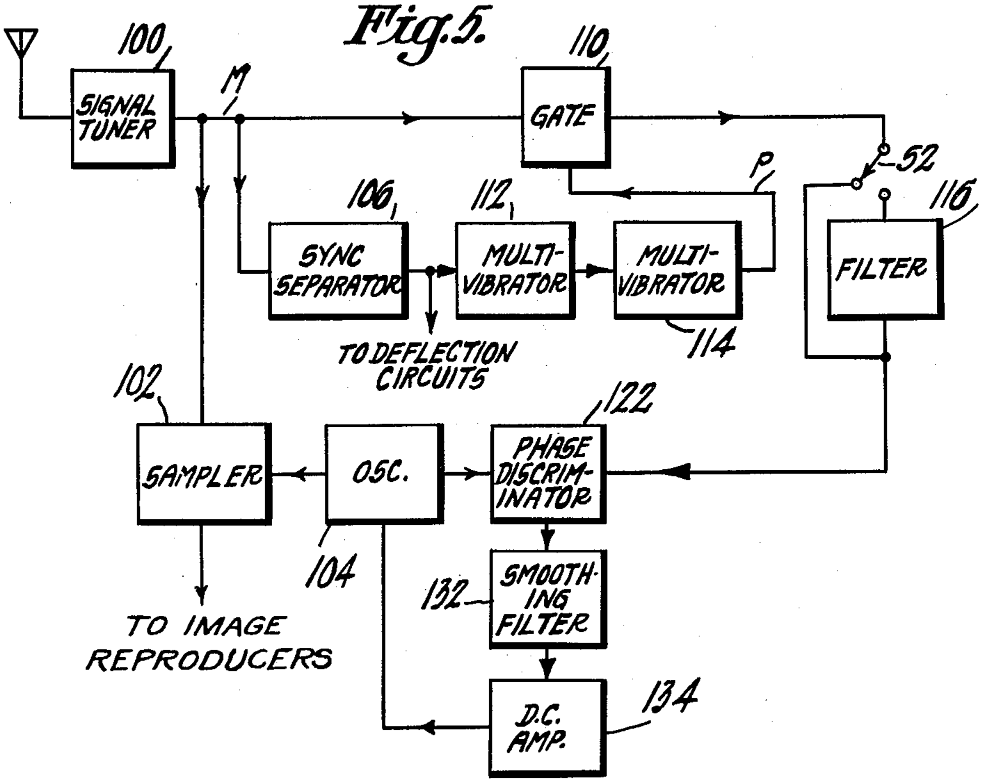
Figure 5 shows in block diagram form a receiver in which the sampling is synchronized with the transmitted sampling control signals.

Figure 5 shows a slightly different arrangement in accordance with the invention for controlling the sampling oscillator at a receiver in accordance with the burst of sampling control frequency present during the back porch interval. Corresponding components in Figures 4 and 5 bear the same numerals. The output of signal tuner 100 is supplied directly to the gate circuit 110 instead of passing through sync separator and top and bottom clipper, as in the case of the arrangement shown in Figure 4. The sync pulse is separated out by sync separator 106 and employed to trigger the multivibrators 112 and 114 as before. The output waveform P of multivibrator 114 serves to open the gate 110 during that portion of the back porch interval occupied by the burst of the sampling and control frequency. The selective filter 116 of Figure 4 is not employed with switch $S_2$ in the position shown, and the output of the gate 110 is applied directly to the phase discriminator 122. However, in addition to the time selection of the bursts of sampling control frequency supplied by the gate 110, frequency selection may also be supplied if $S_2$ is in the opposite position from that shown. In either arrangement the reactance tube of Figure 4 is eliminated and the output of the phase discriminator is applied via a D. C. amplifier and suitable impedance to one of the electrodes of the oscillator tube so as to control its phase and frequency in accordance with principles well known to those skilled in the art.

Figure 6:
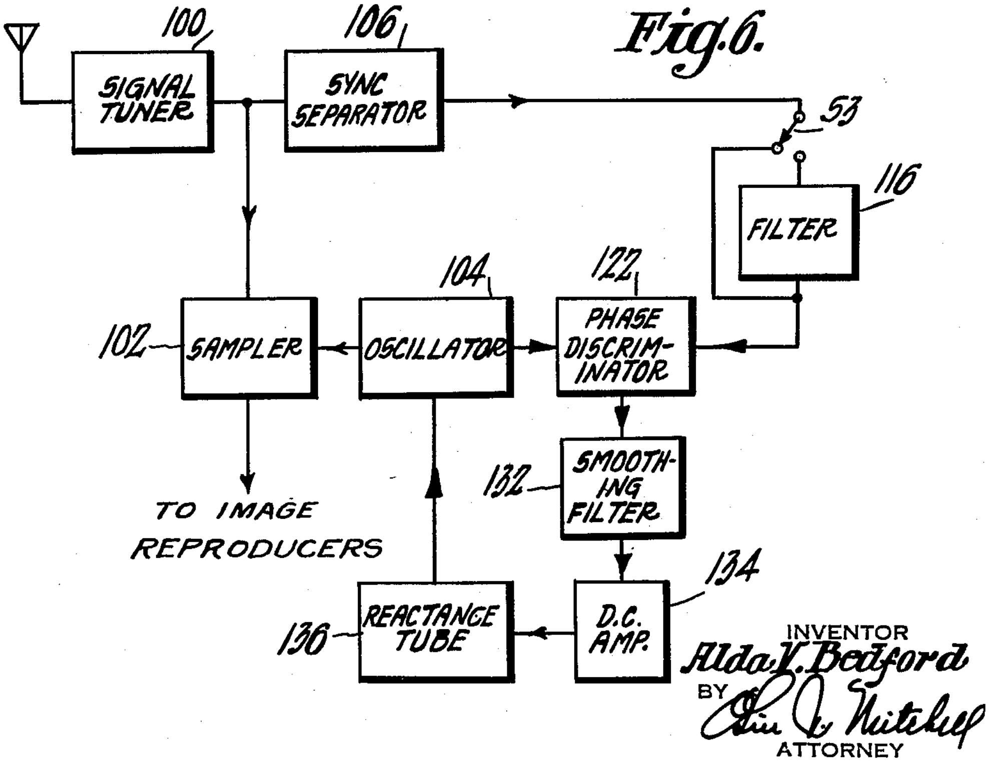
Figure 6 shows in block diagram form another arrangement in which the sampling is synchronized with the transmitted sampling control signal.

Figure 6 shows another arrangement for synchronizing the sampling at a receiver with a burst of sampling control frequency occurring during the back porch interval. In this case, the output of the sync separator 106 is applied directly to the phase discriminator 122. The gate 110 and the selective filter 116 are omitted when $S_3$ is in the position shown. The presence of the horizontal synchronizing pulses should not seriously interfere with the operation of the phase discriminator 122.

However, in addition to the amplitude selection supplied by sync separator 106, frequency selection may also be obtained if switch $S_3$ is in the opposite position from that shown.

All the previous discussion has related to the adaptation of this invention to television systems employing horizontal sync pulses. It would, of course, be possible to eliminate these pulses and employ the burst for synchronizing the scanning at the receiver as well as the phase of an oscillator therein. However, receivers built in accordance with present standards might not operate satisfactorily if the sync pulses were eliminated and therefore it is preferable that the burst be employed in combination with the standard sync pulse.

What is claimed is:

1. Synchronizing apparatus for use in a television transmitter comprising in combination a source of signals having a characteristic thereof varied in accordance with a desired intelligence, an output circuit connected to said source, means for periodically interrupting during intervals of predetermined duration the flow of signals from said source to said output circuit, generating means for deriving a train of pulses each of said pulses occurring within one of said intervals, an oscillator, means for maintaining a constant ratio between the frequency of said oscillator and the frequency of said pulses and means for applying the output of said oscillator to said output circuit during the portion of said intervals following each of said train of pulses.

2. Apparatus for synchronizing an oscillator in a television receiver with bursts of alternating current energy occurring during the back porch intervals comprising in combination a sync separator, means for generating pulses during the back porch intervals in response to the output of said sync separator, a gating device, said gating device being controlled by said pulses, a phase discriminator, an oscillator, connections for applying the output of said oscillator to said discriminator, connections for applying the output of said gating device to said discriminator, and means for controlling the phase and frequency of said oscillator in accordance with the output of said discriminator.

3. In a television receiver of the type adapted to reproduce images from a signal train comprised of video signals, blanking pulses, line frequency sync signals superimposed onto said blanking pulses, and bursts of alternating current waves combined with said blanking pulses, means for selecting said bursts, a phase discriminator to which at least a portion of the output burst of said selecting means is applied, an oscillator having a nominal operating frequency equal to the frequency of the alternating current waves of said bursts, the output of said oscillator being applied to said phase discriminator, and means for controlling the phase of said oscillator in response to the output of said discriminator whereby said oscillator is synchronized in phase and frequency with the alternating current waves of said burst.

4. In a color television receiver adapted to receive television signals containing video signals, bursts of alternating current waves of control frequency and horizontal sync signals, at least portions of said bursts and said horizontal sync signals being of greater amplitude than said video signals, an apparatus for synchronizing an oscillator in phase and frequency with the alternating wave of said bursts of control frequency comprising in combination means for selecting signals having a greater amplitude than said video signals, an oscillator producing an alternating current wave having the same nominal frequency as that of the alternating current waves of said bursts, a phase discriminator to which the output of said oscillator is applied, apparatus for applying at least a portion of the output of said burst selecting means to said phase discriminator, and means for controlling the phase of said oscillator in accordance with the output of said phase discriminator.

5. An apparatus for synchronizing the phase of an oscillator comprising in combination means for selecting horizontal sync signals and bursts of alternating current waves having a mean frequency that is high with respect to the repetition frequency of the horizontal sync signals, a filter to which the output of said selecting means is applied, said filter being adapted to pass said bursts of the alternating current wave and to exclude said horizontal sync signals, a phase discriminator, the output of said oscillator being applied to said phase discriminator, the output of said filter also being applied to said phase discriminator, and means for controlling the phase of said oscillator in response to the output of said phase discriminator whereby said oscillator is synchronized in phase and frequency with the alternating current wave of said burst.

6. A color television receiver adapted to receive video signals, horizontal sync signals and bursts of alternating current waves including a demodulator, an oscillator, a phase discriminator, a first and a second input associated with said discriminator, said first input being connected so as to receive the output of said oscillator, time-selective means for applying at least a portion of each of said bursts derived from the output of said demodulator to said second input of said phase discriminator, and means for controlling the phase of said oscillator in response to the output of said phase discriminator whereby said oscillator is synchronized in phase and frequency with the alternating current wave of said burst.

7. A receiver such as described in claim 6 in which said time-selective means for applying the output of said demodulator to said second input of said phase discriminator during the presence of said bursts includes a gate circuit effectively controlled in response to said horizontal sync signals.

8. A receiver such as described in claim 6 in which said time-selective means includes a frequency-selective filter.

9. In a television receiver adapted to receive color television signals containing video signals, bursts of control frequency and horizontal line sync signals, at least portions of said bursts and said horizontal line sync signals being of greater amplitude than said video signals, an apparatus for controlling the phase of an oscillator in response to said bursts of control frequency comprising in combination: amplitude selective means for selecting signals of greater amplitude than said video signals, said television signals derived from the output of said receiver being applied to said amplitude selective means responsive to said line synchronizing pulses; time-selective means for passing said bursts of control frequency; and frequency selective means tuned to said control frequency; said amplitude-selective means, said time-selective means and said frequency-selective means being connected effectively in series; a phase discriminator having a first and a second input and an output; an oscillator coupled to said first input; the output of said series combination being connected to said second input of said phase discriminator; and means for controlling the phase of said oscillator in response to the signal occurring at the output of said phase discriminator.

10. A receiver such as described in claim 9 in which said amplitude selective means is a sync separator, said time-selective means is a gate circuit, said gate circuit being triggered by horizontal sync pulses, and said frequency selective means is a filter tuned to the frequency of said bursts of control frequency.

11. An apparatus for transmitting intelligence signals in time division multiplex and synchronizing signals that are indicative of the frequency and phase of said intelligence signals comprising in combination a source of a plurality of intelligence signals, a multiplexer to which each of said intelligence signals is applied, an oscillator, said oscillator being coupled to said multiplexer, means for periodically generating a first train of pulses of a predetermined duration and amplitude, means for blanking the output of said source during each of the pulses of said first train, means for combining the output of said multiplexer and said pulses, means for periodically generating a second train of pulses, the pulses of said second train of pulses being coexistent respectively with the pulses of said first train of pulses, the duration of the pulses of said second train being less than the duration of the pulses in said first train, a keying circuit connected between said oscillator and said combining means, and means for triggering said keying means in response to each pulse of said second train of pulses, the output of said combining means being applied to a suitable transmission system.

12. A receiver adapted to reproduce images in color from a transmitted wave having horizontal sync pulses, and video signals that represent sequential variations in the intensities of a plurality of component colors and bursts of alternating current waves comprising in combination; means for deriving said horizontal sync pulses, said video signals and said synchronizing waves; an oscillator; a sampler having a single input circuit and a plurality of output circuits, said sampler being adapted to connect the input circuit to said output circuits in sequence in response to a periodically varying wave provided by said oscillator; and means for synchronizing said oscillator in phase and frequency with said alternating current synchronizing wave bursts.

13. In a television transmitter of the type in which the video signals are repeatedly interrupted by blanking signals and in which sync signals are superimposed on said blanking signals, an apparatus for inserting bursts of alternating current energy during the back porch intervals comprising in combination a sampling oscillator, a sync generator, means for generating a series of pulses which occur during respective back porch intervals, an adder for combining the output of said oscillator with said pulses, means for combining said series of pulses and the output of said oscillator, a limiter for selecting that portion of the output of the oscillator occurring during the back porch intervals, connected to said combining means, and a second adder for combining the output of said limiter with at least some of the signals provided by said sync generator.

14. An apparatus for inserting a control signal into a signal train comprising in combination a source of signals, a generator for supplying blanking pulses at repeated intervals, means for combining said blanking pulses and the signals from said source, means for generating a control pulse during each of said blanking pulse intervals, a fixed frequency oscillator, keying means for deriving bursts of alternating current energy from said oscillator during at least a part of the portion of said blanking pulses, said bursts occurring after each of said control pulses and means including a frequency divider coupled between said oscillator and said keying means so as to establish a predetermined frequency relationship between said oscillator and said keying means.

15. A system for televising images in color comprising in combination: a source of video signals each of which corresponds to the intensity variations of a single component color; a time division multiplexer to which said signals are applied; a first oscillator; means for controlling said multiplexer in accordance with the output of said oscillator; a sync generator; means for deriving bursts of the output of said oscillator in response to at least one of the outputs of said sync generator; means for combining the output of said multiplexer, said bursts and at least some of the outputs of said sync generator; means for transmitting the output signals of said latter means to an image reproducing means located at a remote point; said reproducing means comprising, means for receiving said transmitted signals; a sampler connected to said receiving latter means; a second oscillator connected so as to control said sampler; means for reproducing images in color connected to the output of said sampler; means for selecting said bursts of the output of said first oscillator; a phase discriminator to which the bursts and the output of said second oscillator are applied; and means for controlling the phase of said second oscillator in accordance with the output of said discriminator.

16. A color television transmitter comprising in combination a plurality of sources of video signals each of which simultaneously represents the intensity variation of a different color, a sync generator adapted to provide pulses at line deflection frequency, a time division multiplexer having a single output and a plurality of inputs, each of said inputs being coupled to one of said sources of video signals and adapted to successively conduct each of said video signals to the single output of the multiplexer, a sampling oscillator having a frequency that is appreciably greater than line deflection frequency, the output of said sampling oscillator being coupled so as to maintain the frequency of successive periods of conduction of said time division multiplexer appreciably greater than line deflection frequency, a gating device coupled to the output of said sampling oscillator, means for rendering said gating device operative to intermittently supply signals from said sampling oscillator in response to the pulses of line deflection frequency supplied by said sync generator, and means to combine the multiplexed video signals, pulses of line deflection frequency and the intermittent signals supplied by said gating device.

17. Apparatus as defined in claim 16 wherein the signals that are intermittently supplied by said gating device constitute at least a plurality of cycles of the output from said sampling oscillator.

18. In a color television system wherein the conveyed signal is comprised of pulses of line deflection frequency and video signals that represent, at a predetermined fixed frequency, different color values interspersed between each of said pulses and in which a control signal burst of alternating current wave of said predetermined fixed frequency occurs after each of said pulses of line deflection frequency, a color television receiver comprising in combination, an oscillator adapted to operate at said predetermined fixed frequency, a sampler coupled to the output of said oscillator, a phase discriminator, means for coupling the output of said oscillator to said phase discriminator, means for applying at least a portion of said control signal bursts to said phase discriminator, and means for synchronizing said oscillator bursts in phase and frequency with said alternating current wave in response to the output of said phase discriminator.

19. In a color television receiver adapted to produce images from signals including line synchronizing signals, a carrier that is phase modulated in accordance with certain color information and bursts of alternating current waves having the same frequency as the color carrier and providing a phase reference, said bursts of alternating current waves occurring during horizontal blanking intervals, apparatus for recovering the information represented by the phase of the color carrier comprising in combination an oscillator, means for maintaining the oscillator in a fixed phase relationship with respect to the bursts of alternating current waves, and means for sampling the phase modulated color carrier with the output of said oscillator.

20. A color television receiver adapted to receive a composite signal including a video signal component having a modulated alternating current wave representing the color information of an image to be reproduced, a line synchronizing signal component having a repetition rate equal to the rate at which horizontal lines of the image are scanned and a color synchronizing signal component consisting of bursts of oscillations having a frequency greater than the repetition rate of said line synchronizing signal component and having a given relationship to the frequency of said alternating current wave, said receiver including in combination: means providing local oscillations having a frequency bearing a fixed relationship to the frequency of the oscillations of said bursts; means for controlling the phase of said local oscillations by the bursts of oscillations of said color synchronizing signal component; and means for combining said local oscillations with said video signal component to convert said received alternating current wave to a form suitable for reproducing a color image.

21. A color television receiver adapted to receive a composite signal including a video signal component having a modulated alternating current wave representing the color information of an image to be reproduced, a line synchronizing signal component having a repetition rate equal to the rate at which horizontal lines of the image are scanned and a color synchronizing signal component consisting of bursts of oscillations having a frequency greater than the repetition rate of said line synchronizing signal component and having a given relationship to the frequency of said alternating current wave, said receiver including in combination: oscillatory means providing an output having a frequency equal to the rate of the oscillations of said bursts; means for controlling the phase of the output of said oscillatory means by the bursts of oscillations of said color synchronizing signal component; and means for combining the output of said oscillatory means with the alternating current wave of said video signal component to convert said alternating current wave to a form suitable for reproducing a color image.

22. A color television receiver adapted to receive a composite signal including a video signal component having a modulated alternating current wave representing the color information of an image to be reproduced, a line synchronizing signal component having a repetition rate equal to the rate at which horizontal lines of the image are scanned and a color synchronizing signal component consisting of bursts of oscillations having a frequency equal to the frequency of said carrier wave and a repetition rate equal to the repetition rate of said line synchronizing signal component, said receiver including in combination: an oscillator providing a reference wave having a frequency equal to the frequency of said alternating current wave; means for controlling the phase of said reference wave by the bursts of oscillations of said color synchronizing signal component; and means for combining said reference wave with said alternating curent wave to convert said alternating current wave to a form suitable to be applied to color image reproducing means.

23. A color television receiver adapted to receive a composite signal including a video signal component representing the color information of an image to be reproduced, a line synchronizing signal component having a repetition rate equal to the rate at which horizontal lines of the image are scanned and a color synchronizing signal component consisting of bursts of oscillations having a frequency greater than the repetition rate of said line synchronizing signal component, said receiver including in combination: an oscillator providing an output having a frequency bearing a fixed relationship to the frequency of the oscillations of said bursts; means including a phase discriminator responsive to said bursts and to said oscillator output for controlling the phase of said oscillator output by said color synchronizing signal component; and means for combining said oscillator output with said video signal component to convert said received signal to a form suitable for reproducing a color image.

24. In a color television receiver adapted to receive color television signals including video signals, bursts of control frequency and horizontal sync signals, at least a portion of said bursts and said horizontal sync signals being of greater amplitude than said video signals, an apparatus for controlling the phase of oscillatory means in response to said bursts of control frequency including in combination: amplitude-selective means for selecting signals of greater amplitude than said video signals, said amplitude-selective means being responsive to said television signals; time-selective means controlled by said horizontal sync pulses for passing said bursts of control frequency; frequency-selective means tuned to said control frequency for segregating said bursts of control frequency; a source of local oscillations; a phase discriminator responsive to said local oscillations and to the output of one of said selective means for developing a control signal indicative of the phase relationship of said local oscillations and said bursts of control frequency; and means responsive to said control signal for controlling the phase of said local oscillations.

25. Apparatus for producing a train of signals for use in a color television system in which color representative video signals are sampled for transmission at a frequency higher than the horizontal line repetition rate, said sampling frequency having a fixed relationship to said horizontal line repetition rate, said signals including horizontal and vertical sync pulses and bursts of a sampling control frequency, said apparatus including in combination: means including a source of a first alternating current wave having said sampling frequency for producing said bursts of sampling control frequency; means responsive to said first alternating current wave for developing a second alternating current wave having a given frequency relationship to both of the horizontal and vertical sync pulse repetition rates; and means responsive to said second alternating current wave to develop said horizontal and vertical sync pulses.

26. Apparatus for producing a train of signals for use in a color television system in which color representative video signals are sampled for transmission at a frequency higher than the horizontal line repetition rate, said sampling frequency having a fixed relationship to said horizontal line repetition rate, said signals including horizontal and vertical sync pulses and bursts of a sampling control frequency, said apparatus including in combination: a source of a first alternating current wave having said sampling frequency; means coupled to said first alternating current wave source for producing said bursts of sampling control frequency; means including a frequency divider responsive to said sampling frequency alternating current wave for developing a second alternating current wave having an integral multiple relationship to both of the horizontal and vertical sync pulse repetition rates; and means responsive to said second alternating current wave to develop said horizontal and vertical sync pulses.

27. Apparatus for producing a train of signals for use in a color television system in which color representative video signals are sampled for transmission at a frequency higher than the horizontal line repetition rate, said sampling frequency having a fixed relationship to said horizontal line repetition rate, said signals including horizontal and vertical sync pulses and bursts of a sampling control frequency, said apparatus including in combination: a source of a first alternating current wave having a sampling frequency equal to an odd multiple of one-half of the horizontal line repetition rate; means including a frequency divider responsive to said sampling frequency alternating current wave to develop a second alternating current wave having an integral multiple relationship to both of the horizontal and vertical sync pulse repetition rates; means responsive to said second alternating current wave to develop said horizontal and vertical sync pulses; means responsive to said second alternating current wave to produce control pulses having the horizontal line repetition rate, said control pulses closely following said horizontal sync pulses in time; means responsive to said control pulses and to said first alternating current wave for producing said bursts of sampling control frequency; and means for combining said horizontal and vertical sync signals with said bursts of sampling control frequency.

28. In a color television receiver adapted to receive color television signals including video signals, bursts of control frequency and horizontal sync signals, an apparatus for controlling the phase of oscillatory means in response to said bursts of control frequency including in combination: means including a gate circuit having said television signals impressed thereon; means responsive to said horizontal sync signals for developing gate control pulses; means to impress said control pulses upon said gate circuit to periodically permit the passage of said bursts of control frequency; a source of local oscillations for combination with said video signals to convert said video signals to a form suitable for reproducing a color image; and a phase discriminator responsive to said local oscillations and to said selected bursts of control frequency for developing a signal to control the phase of said local oscillations.

References Cited in the file of this patent

UNITED STATES PATENTS

| | | |
|---|---|---|
| 2,326,515 | Bartelink | Aug. 10, 1943 |
| 2,339,536 | Wessdt | Jan. 18, 1944 |
| 2,378,746 | Beers | June 19, 1945 |
| 2,401,384 | Young | June 4, 1946 |
| 2,463,685 | Fredendall et al. | Mar. 8, 1949 |
| 2,465,371 | Grieg | Mar. 29, 1949 |
| 2,502,213 | Fredendall et al. | Mar. 25, 1950 |
| 2,539,440 | Labin | Jan. 30, 1951 |
| 2,546,972 | Chatterjea | Apr. 3, 1951 |
| 2,601,516 | Gray | June 24, 1952 |

OTHER REFERENCES

"Transmission of Television Sound on the Picture Carrier," Fredendall, Schlesinger and Schroeder, RCA Laboratories Publication, reprinted from IRE, Feb. 1946.

"Circuits for Horizontal A. F. C.," Gardner, Radio-Electronics, July 1949, pp. 24–26.